United States Patent
Uhlendorf

(10) Patent No.: US 10,598,509 B2
(45) Date of Patent: Mar. 24, 2020

(54) METHOD FOR OPERATING A NAVIGATION SYSTEM

(71) Applicant: GM GLOBAL TECHNOLOGY OPERATIONS LLC, Detroit, MI (US)

(72) Inventor: Thomas Uhlendorf, Eppstein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 242 days.

(21) Appl. No.: 15/850,328

(22) Filed: Dec. 21, 2017

(65) Prior Publication Data

US 2018/0180437 A1 Jun. 28, 2018

(30) Foreign Application Priority Data

Dec. 22, 2016 (DE) .................. 10 2016 015 412

(51) Int. Cl.
*G01C 21/36* (2006.01)

(52) U.S. Cl.
CPC ....... *G01C 21/367* (2013.01); *G01C 21/3676* (2013.01)

(58) Field of Classification Search
CPC ................. G01C 21/367; G01C 21/3676
USPC ....................................................... 701/428
See application file for complete search history.

(56) References Cited

U.S. PATENT DOCUMENTS

| | | | | |
|---|---|---|---|---|
| 6,067,502 A * | 5/2000 | Hayashida | ........... | G01C 21/367 340/990 |
| 6,484,090 B1 * | 11/2002 | Lahaije | .................. | G01C 21/32 701/532 |
| 2005/0177305 A1 * | 8/2005 | Han | ...................... | G01C 21/367 701/431 |
| 2007/0078599 A1 * | 4/2007 | Yoshioka | ............. | G01C 21/367 701/454 |
| 2011/0307174 A1 * | 12/2011 | Uusitalo | .............. | G01C 21/367 701/300 |
| 2014/0114574 A1 * | 4/2014 | Tertoolen | ............. | G01C 21/367 701/533 |
| 2014/0365935 A1 * | 12/2014 | Moha | .................. | G06F 3/04815 715/769 |
| 2016/0203624 A1 * | 7/2016 | Anderson | ............... | G06T 11/60 345/419 |
| 2017/0010125 A1 * | 1/2017 | Adachi | ............. | G01C 21/3697 |
| 2017/0052672 A1 * | 2/2017 | Forstall | ............. | G01C 21/3638 |

* cited by examiner

*Primary Examiner* — Krishnan Ramesh
(74) *Attorney, Agent, or Firm* — Lorenz & Kopf, LLP

(57) ABSTRACT

A method is disclosed for operating a navigation system with a graphic display of a north-pointing map section of a digital road map. A map section to be displayed includes a current position and at least one section of a route to a specified destination. A selection sequence selects the displayed map section. The selection sequence uses a double frame, which is positioned on a start position on the digital road map. The double frame is repeatedly displaced in at least one direction with respect to the digital road map. The map section to be displayed is selected when a condition for a termination of the selection step sequence is met.

20 Claims, 4 Drawing Sheets

METHOD FOR OPERATING A NAVIGATION SYSTEM

CROSS-REFERENCE TO RELATED APPLICATION

This application claims priority to German Patent Application No. 102016015412.8, filed Dec. 22, 2016, which is incorporated herein by reference in its entirety.

TECHNICAL FIELD

The present disclosure relates to a method for operating a navigation system as well as a navigation system.

BACKGROUND

A navigation system for use in a motor vehicle generally includes a computer having a microprocessor and memory storing a digital road map. The navigation system may also include a screen, on which a map section with a current position can be displayed. The size of the map section may be selected using an adjustable image scale. Moreover, a corresponding section of a route from the current position to a specified destination may be displayed on the map section when a route guidance is active.

The map section may also be displayed on the screen in various display modes, e.g. in a three-dimensional (3-D) perspective view, which shows a bird's-eye view in the direction of motion, or in a two-dimensional (2-D) display in a plan view onto a map section. Such a 2-D map section may be displayed north-pointing or direction-pointing on the screen.

In the case of a direction-pointing display, the digital road map around the current position is continuously orientated in the direction of motion. In other words, the direction of motion in the display on the screen is always orientated in the direction of an upper edge. The current position is indicated for example with an arrow-shaped cursor. The tip of the arrow marks the direction of travel, which in the case of the direction-pointing display always points in the direction of the upper edge of the map section or of the screen. The arrow-shaped cursor is arranged for example in the vertical direction in the lower half of the map section, preferably at the lower edge. The cursor is preferably centered horizontally with respect to the map section.

In the case of a north-pointing display, the geographical north of the digital road map is always orientated towards the upper edge of the screen display. The current position can be marked with an arrow-shaped cursor on the displayed map section, which cursor is continuously orientated in the direction of travel and thus indicates the current direction of travel on the screen. In the case of the north-pointing display, the arrow-shaped cursor, which marks the current position on the digital road map, is held in a fixed position, preferably in the center of the map section displayed on the screen. If a route guidance to a specified destination is active, a section of the corresponding planned route is displayed on the displayed map section. The planned route arises in the center of the displayed map section. Depending on the set map scale, which determines the size of the displayed map section, the displayed section of the planned route may run out of the displayed map section in one direction. This is usually the case especially with small map scales, i.e. with a detailed display of the digital road map on the screen.

In the case of the north-pointing display of a digital road map with a planned route on a screen of a navigation system, the route section from the center-point of the screen display often runs directly to the edge of an image of the display in one direction. This means that, in the case of the north-pointing display, only a small proportion of the available display area on the screen or the map section is used to display the route ahead. The vehicle driver thus also receives only limited information concerning the route ahead.

Accordingly, there is a need in the art to provide an improved north-pointing display of a digital road map with a planned route such that more information concerning the route ahead is displayed.

SUMMARY

Accordingly, a method, computer program and navigation system are disclosed for operating a navigation system to provide an improved north-pointing display of a digital road map with a planned route such that more information concerning the route ahead is displayed.

According to a first aspect of the present disclosure, a method is provided for operating a navigation system with a graphic display of a north-pointing map section of a digital road map. A map section to be displayed includes a current position and at least one section of a route to a specified destination.

The map section to be displayed is selected with a selection sequence, in which a double frame is provided and further includes which includes the following steps: positioning of the double frame on a start position on the digital road map, step-by-step displacement of the double frame with respect to the digital road map, and selection of the map section to be displayed, as soon as it has been ascertained that a condition for a termination of the selection step sequence is met.

An underlying concept of the present disclosure is to select a map section to be displayed which is not centered on a current position of the own vehicle location, but rather around a point which is determined depending on the current position and the course of the route ahead. The double frame can be regarded as a software module of the navigation system, which is displaced from a start point iteratively by the processor system of the navigation system with respect to the digital road map until such time as a condition for the end of the selection is reached.

According to an embodiment of the present disclosure, a center-point of the double frame may be placed on the current position for the positioning on the start position. The current position represents a clearly defined point on the digital road map and is at the same time the criterion for the optimum selection of a map section to be displayed. For the double frame, a rectangular outer frame and a rectangular inner frame are defined to be concentrically arranged around the center-point of the double frame and a horizontal area bisector is aligned parallel with the east-west direction of the digital road map. The size of the double frame may preferably depend on a set map scale for the display of the map section to be displayed.

The double frame may contain two polygonal chains in the form of rectangles. The side ratios of these rectangles lying concentrically one inside the other can be adapted to the side ratio of a screen for displaying the map section. The outer frame of the double frame can, in its final position with respect to the digital road map after the termination of the selection step sequence, define the map section to be displayed. Alternatively, the map section to be displayed can be displayed larger by a predetermined measure than selected by the outer frame. With the inner frame, a criterion for the termination of the selection step sequence can be created with its position with respect to the digital road map.

According to an embodiment, the step-by-step displacement of the double frame with respect to the start position may take place in a first direction and/or in an optional second direction. The step-by-step displacement in the first direction can take place in the horizontal direction or in the vertical direction. The horizontal direction corresponds to the east-west direction of the digital road map, the vertical direction to the north-south direction of the digital road map. The step-by-step displacement in the optional second direction can take place orthogonally with respect to the first direction. The double frame is thus displaced parallel to the compass directions defined by the digital road map in the east-west direction and in the north-south direction.

According to an embodiment, the step-by-step displacement in the horizontal direction can take place to the right, if it is ascertained that the route first intersects the outer frame at a right-hand side after the start of the selection step sequence. The step-by-step displacement in the horizontal direction can take place to the left, if it is ascertained that the route first intersects the outer frame at a left-hand side after the start of the selection step sequence. During the progression through the selection step sequence, it is ascertained once, in respect of the step-by-step displacement in the horizontal direction, which corresponds to a step-by-step displacement in the east-west direction on the digital road map, whether the displacement takes place to be right, i.e. takes place in an easterly direction, or whether the displacement takes place to the left, i.e. to the west according to the digital road map.

According to an embodiment, the step-by-step displacement can take place upwards in the vertical direction, if it is ascertained that the route first intersects the outer frame at an upper side after the start of the selection step sequence. The step-by-step displacement can take place downwards in the vertical direction, if it is ascertained that the route first intersects the outer frame at a lower side after the start of the selection step sequence. During the progression through the selection step sequence, it is ascertained once, in respect of the step-by-step displacement in the vertical direction, which corresponds to a step-by-step displacement in the north-south direction on the digital road map, whether the displacement takes place upwards, i.e. to the north, or whether the displacement takes place downwards, i.e. to the west according to the digital road map.

According to a further embodiment, the condition for the termination of the selection step sequence is met when the current position leaves the inner frame. A condition for the selection is a map section to be displayed such that the current position is located inside a predetermined inner frame after termination of the selection step sequence. Insofar as the inner frame is selected smaller than the outer frame, it is ensured that the current position lies inside the selected map section to be displayed.

According to a further embodiment, a condition for a termination of the selection step sequence can be met as soon as the outer frame is no longer intersected by the route. According to a further embodiment, the selection step sequence can be repeated as soon as the current position on the digital road map has changed by a predetermined distance.

The selection step sequence is thus repeated cyclically depending on the route covered. The predetermined distance at which a new selection step sequence is triggered can be made dependent on a set map scale.

According to a further aspect of the present disclosure, a computer program is disclosed which, when it is executed on a computing unit inside a navigation system, instructs the respective computing unit to execute the previously described method. A further aspect of the present disclosure relates to a computer program product with a program code, which is stored on a medium readable by a computer, for executing the previously described method.

A further aspect of the present disclosure relates to a navigation system with a display device for a graphic display of a north-pointing map section of a digital road map, a computing unit and a program code for executing the previously described method.

Further features and details emerge from the following description, claims and accompanying drawings. Described and/or illustrated features form the subject-matter individually or in any reasonable combination.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
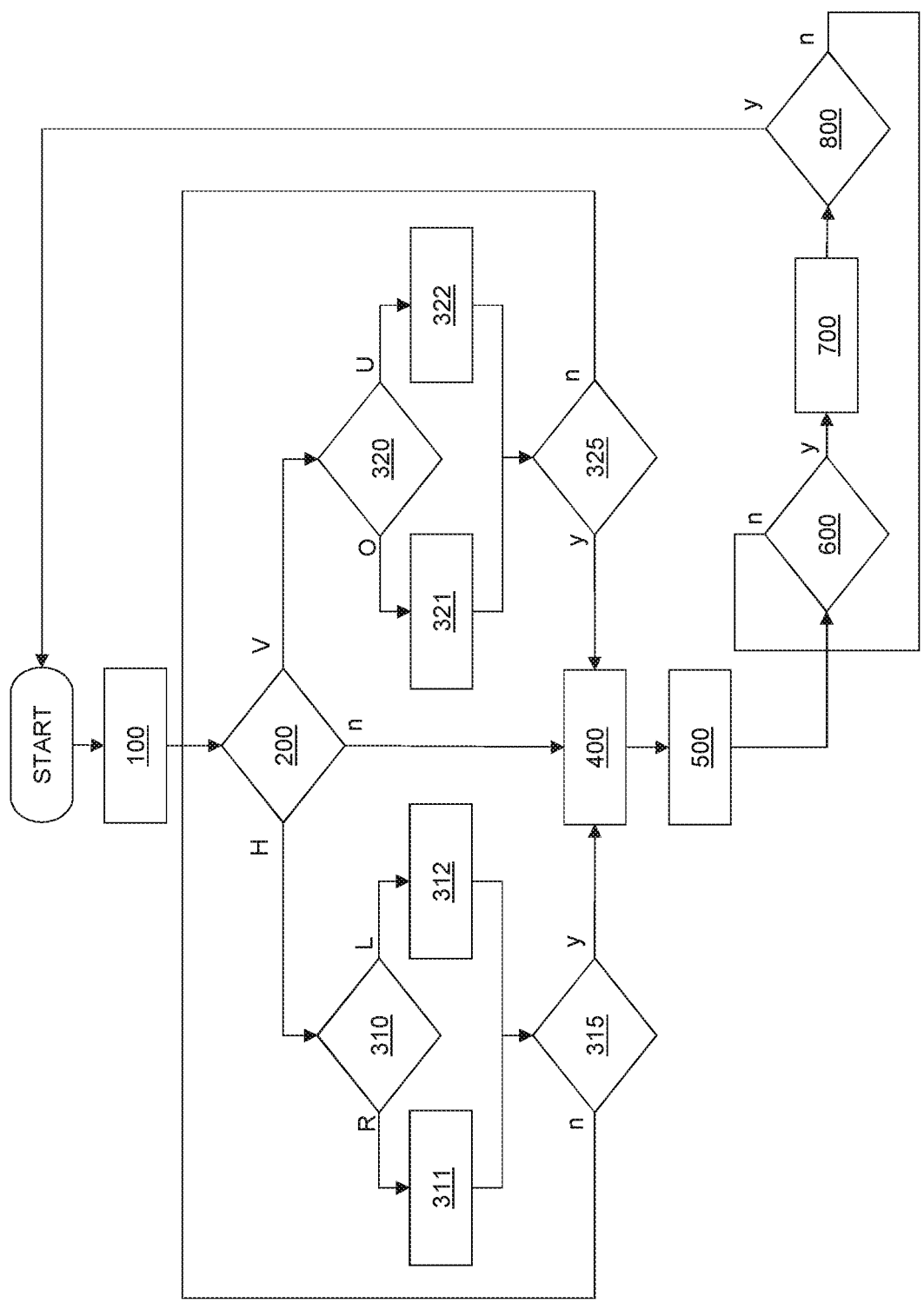
FIG. 1 shows a sequence diagram for an embodiment of a method according to the present disclosure.

FIG. 1 represents a sequence diagram, which illustrates an implementation of the method according to the present disclosure. As soon as a route has been calculated after the inputting of a destination in a navigation system, a map section of the digital road map can be displayed on a screen of the navigation system dependent on a set map scale.

Such a map section contains the display of at least one section of the route ahead to an inputted destination, as well as the display of a current position of the own vehicle on the digital road map, which is marked by an arrow-shaped cursor. In the case of a north-pointing display, the geographical north of the digital road points in the direction of the upper boundary of a map section shown on the screen. The tip of the arrow of the cursor for marking the current position preferably points in the direction of travel of the vehicle i.e. in the compass direction in which the vehicle is moving.

Figure 2A:
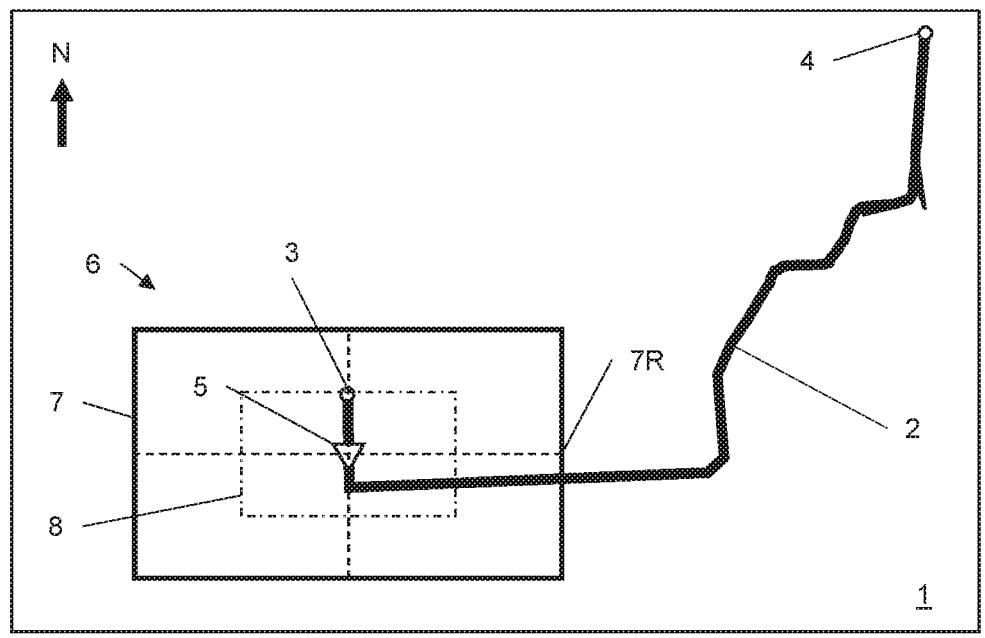
FIGS. 2a-2b show a selection of a map section of a first route with two steps.

FIG. 2a represents a digital road map 1 with a planned route 2, which leads via a road network from a starting point 3 to a destination point 4. The road network with a number of turnings, minor roads etc. is not represented in FIG. 2a and in the following figures in order to provide a clearer illustration.

Outer frame 7 marks a map section, which is usually used for displaying a route ahead in a north-pointing display. Cursor 5 is located in the center of the map section. The downwardly pointing tip of the arrow indicates that the own vehicle is moving in a southerly direction along route 2 to destination point 4. The route already covered between starting point 3 and the current position marked by cursor 5 can be omitted in the course of a cyclical updating of the routes, which would be recalculated each time only from current location 5 to destination point 4. For the purpose of a simplified representation, the entire route from an original starting point 3 to a destination point 4 is represented in FIGS. 2a-3c.

As can be seen from FIG. 2a, the planned route is displayed only in the lower right-hand quarter of the display area in the case of a conventional selection of a map section to be displayed for a north-pointing display. The remaining three quarters of the area selected for the screen output does not contain any relevant content for the route ahead.

Figure 2B:
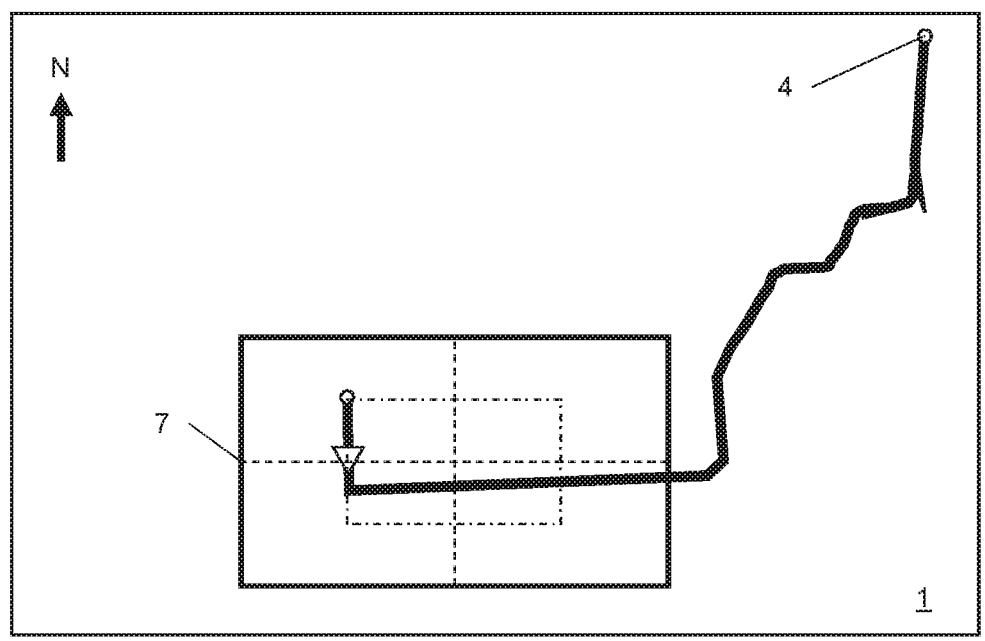

The method described in detail below improves the selection of a map section to be displayed in such a way that more information can be displayed concerning route 2 ahead. An achieved result is illustrated in FIG. 2b. Cursor 5, which marks the current position of the vehicle on digital road map 1, is not arranged in the center of outer frame 7 as in the case of a conventional selection of a north-pointing map section to be displayed, but rather off-center in the left-hand half in outer frame 7. In contrast with FIG. 2a, it becomes clear that the route ahead now occupies a much larger display area.

Before the start of the method for selecting a map section, the current position of a vehicle has been determined for example by a satellite-assisted positioning system and an updated planned route 2 is present. As emerges from FIG. 1 in connection with FIG. 2a, the center of double frame 6 is centered on cursor 5 of the current position in procedural step 100. In step 200, it is determined that planned route 2 intersects and leaves outer frame 7 at right-hand side 7R. Consequently, the procedural sequence after step 200 follows the branch for a horizontal displacement H of double frame 6 to step 310. In step 310, information is retrieved as to whether route 2, during the start of the procedural sequence, has first intersected the right-hand or the left-hand side. Corresponding to the example according to FIG. 2a, the sequence branches onto a horizontal right-hand displacement R to step 311. In step 311, double frame 6 is displaced to the right by a defined distance. A check is then made in step 315 to establish whether cursor 5 touches the edge of inner frame 8 following the displacement in the right-hand direction. If the cursor does not touch inner frame 8, the procedural sequence branches back to step 200.

A loop with an incremental displacement of double frame 6 in the right-hand direction is thus run through, until the cursor touches the edge of inner frame 8 or until route 2 no longer intersects outer frame 7. In this case, the selection of the map section is terminated in step 400. Outer frame 7 defines the map section that is displayed on a screen of the navigation system.

With the display of the selected map section, cursor 5, which marks the current position on the map, moves further corresponding to a covered route on the displayed route section. In step 500, therefore, a counter is reset to zero, which in step 700 is increased each time to one, if it has previously been ascertained in step 600 that cursor 5 has moved by a pixel of the screen. In step 800, a check is made to establish whether the counter has reached a predetermined value. If the predetermined value is reached, the method for selecting a map section is started afresh. If not, the loop between steps 600 to 800 is run through until such time as the predetermined value is reached.

Figure 3A:
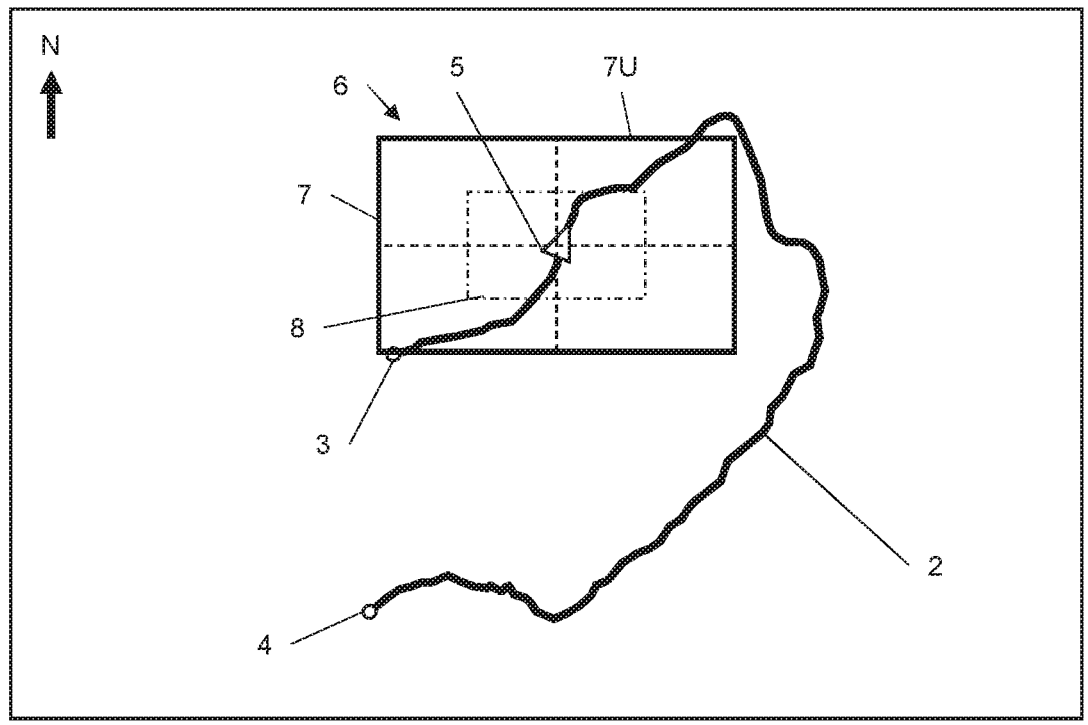
FIGS. 3a-3c show a selection of a map section of a second route with three steps.
Figure 3B:
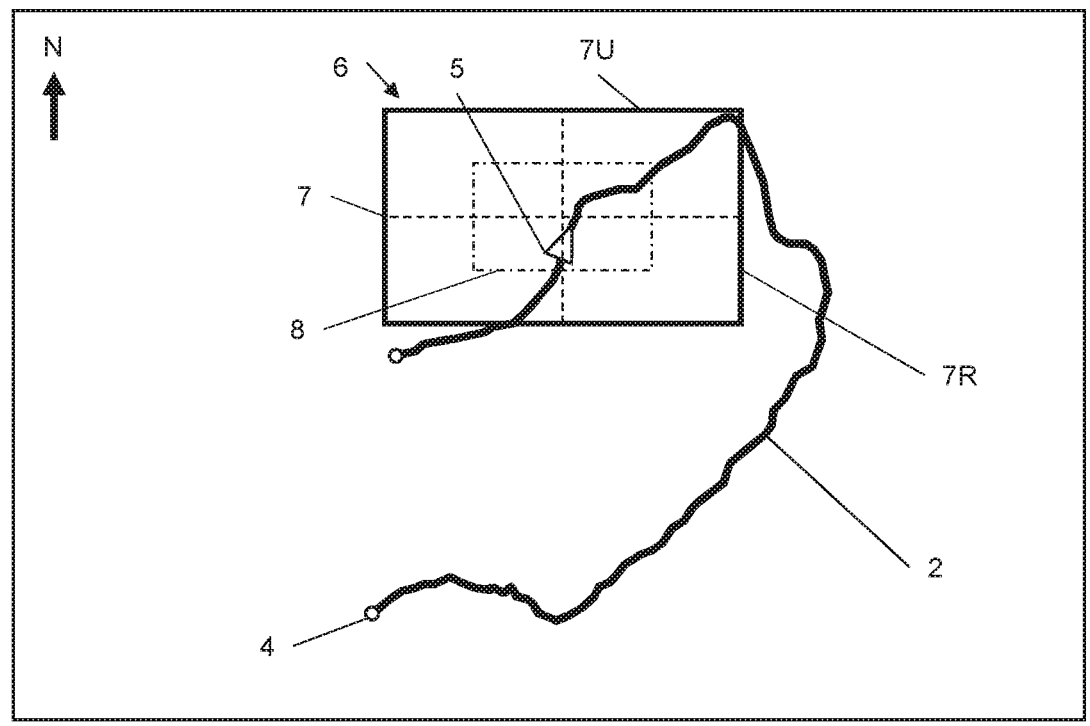
Figure 3C:
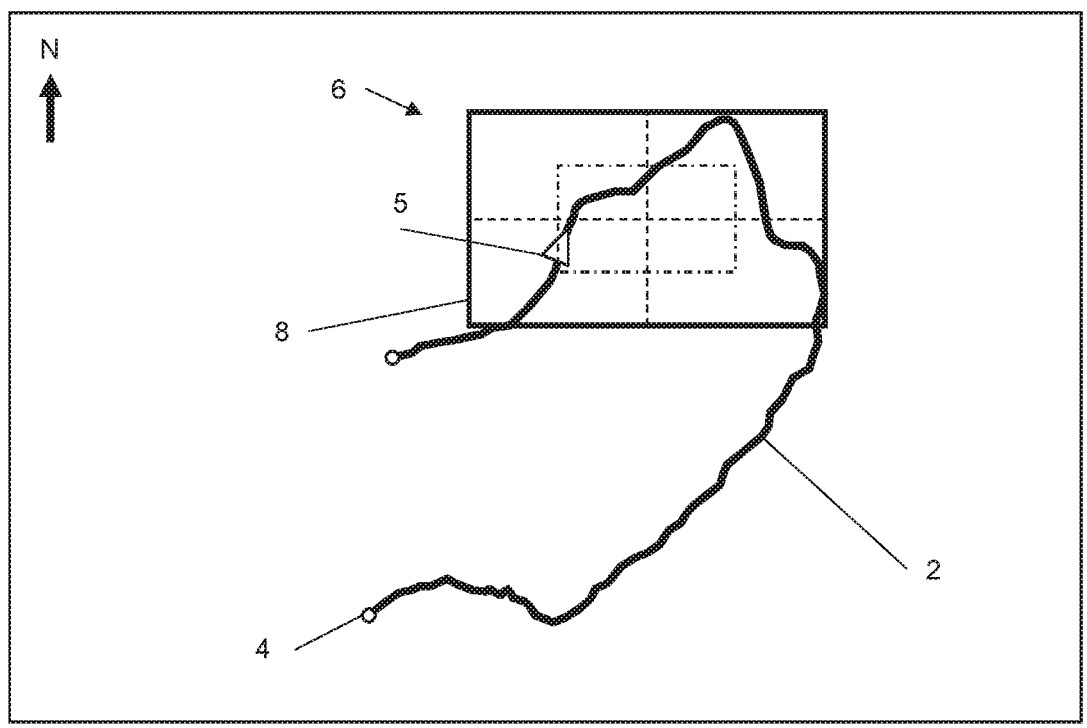

FIGS. 3a-3c illustrate the procedural sequence according to FIG. 1 on the basis of another planned route.

In step 100, the center of double frame 6 is first centered on cursor 5, which marks the current position on digital road map 1. It is then ascertained in step 200 that route 2 along its course from the current position of cursor 5 to destination point 4 first intersects outer frame 7 of double frame 6 at upper edge 7U. Consequently, the procedural sequence after step 200 follows the branch for a vertical displacement V of double frame 6 to step 320. In step 310, if it is ascertained that route 2, during the start of the procedural sequence, has first intersected upper edge 7U of outer frame 7 in respect of the vertical direction, the sequence correspondingly branches onto a vertical displacement upwards U to step 321. In step 321, double frame 6 is displaced upwards by a defined distance.

In step 315, a check is made to establish whether cursor 5 touches the edge of inner frame 8 following the displacement in the upper direction. If the cursor does not touch inner frame 8, the procedural sequence branches back to step 200. This loop between steps 200 and 325 is run through until double frame 6 has been displaced upwards to an extent such that the route, as is represented in FIG. 2b, no longer intersects upper edge 7U, but now intersects right-hand edge 7R.

After step 200, the procedural sequence branches onto horizontal displacement H of double frame 6 to step 310. In step 310, it is ascertained that route 2 has first intersected the right-hand side during the start of the procedural sequence, so that the procedure branches to step 311 and double frame 6 is displaced to the right by a defined distance.

The frame is displaced in a loop between steps 200 and 315 until such time as the condition is met in step 315 and cursor 5 touches the edge of inner frame 8, as is represented in FIG. 3. The selection of the map section is consequently terminated in step 400. The selected map section can be outputted on the screen of the navigation system.

A renewed execution of the selection of a map section is ensured by the routine of steps 500 to 800.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method for operating a navigation system to provide a north-pointing display of a route having a current position and a destination point on a digital road map comprising:
    determining a selected map section with a selection sequence including:
        positioning a double frame having an inner frame and an outer frame with respect to a start position on the digital road map to enclose the start position within the double frame;
        repeatedly displacing the double frame in at least one direction with respect to the digital road map;
        determining when the current position is located outside of the inner frame as a condition for termination of the selection sequence;
        selecting the map section to be displayed when the condition for the termination of the selection sequence is met; and displaying the selected map section, the current position and a portion of the route within the double frame.

2. The method according to claim 1, further comprising positioning a center-point of the double frame on the current position for the positioning the start position.

3. The method according to claim 2, wherein the double frame comprises a rectangular outer frame defining the center-point and a rectangular inner frame arranged concentrically within the rectangular outer frame around the center-point, and the method further comprises aligning a horizontal area bisector parallel to an east-west direction of the digital road map.

4. The method according to claim 1, wherein repeatedly displacing the double frame comprises displacing the double frame in at least one of a horizontal direction or a vertical direction.

5. The method according to claim 1, wherein repeatedly displacing the double frame comprises displacing the double frame along at least a first axis and a second axis.

6. The method according to claim 5, wherein repeatedly displacing the double frame comprises orthogonally displacing the double frame along the second axis with respect to the first axis.

7. The method according to claim 5, wherein the first axis is a horizontal axis and repeatedly displacing the double frame further comprises:
horizontally displacing the double frame to the right along the horizontal axis when the route intersects a right-hand edge of the outer frame after the selection sequence is initiated; and
horizontally displacing the double frame to the left along the horizontal axis when the route intersects a left-hand edge of the outer frame after the selection sequence is initiated.

8. The method according to claim 7, wherein the second axis is a vertical axis and repeatedly displacing the double frame further comprises:
vertically displacing the double frame upwardly along the vertical axis when the route intersects an upper edge of the outer frame after the selection sequence is initiated; and
vertically displacing the double frame downwardly along the vertical axis when the route intersects a lower edge of the outer frame after the selection sequence is initiated.

9. The method according to claim 1, further comprising determining when the outer frame does not intersect the route as the condition for termination of the selection sequence.

10. The method according to claim 1, further comprising repeating the selection sequence when the current position on the digital road map has changed by a predetermined distance.

11. A non-transitory computer readable medium comprising a program code having an instruction set, which when executed on a computer, performs the method according to claim 1.

12. A navigation system comprising:
a display device for a graphic display of a north-pointing map section of a digital road map;
a processor; and
memory storing a program code having an instruction set executed on the processor for performing the method according to claim 1.

13. A method for operating a navigation system to provide a north-pointing display of a route having a current position and a destination point on a digital road map comprising:
determining a selected map section with a selection sequence including:
positioning a double frame having an inner frame and an outer frame with respect to a start position on the digital road map to enclose the start position within the double frame;
repeatedly displacing the double frame in at least one direction with respect to the digital road map;
determining when the outer frame does not intersect the route as a condition for termination of the selection sequence;
selecting the map section to be displayed when the condition for the termination of the selection sequence is met; and
displaying the selected map section, the current position and a portion of the route within the double frame.

14. The method according to claim 13, further comprising positioning a center-point of the double frame on the current position for the positioning the start position.

15. The method according to claim 14, wherein the double frame comprises a rectangular outer frame defining the center-point and a rectangular inner frame arranged concentrically within the rectangular outer frame around the center-point, and the method further comprises aligning a horizontal area bisector parallel to an east-west direction of the digital road map.

16. The method according to claim 13, wherein repeatedly displacing the double frame comprises displacing the double frame along at least a first axis and a second axis.

17. A method for operating a navigation system to provide a north-pointing display of a route having a current position and a destination point on a digital road map comprising:
determining a selected map section with a selection sequence including:
positioning a double frame having an inner frame and an outer frame with respect to a start position on the digital road map to enclose the start position within the double frame;
repeatedly displacing the double frame in at least one direction with respect to the digital road map;
selecting the map section to be displayed when a condition for a termination of the selection sequence is met;
displaying the selected map section, the current position and a portion of the route within the double frame; and
repeating the selection sequence when the current position on the digital road map has changed by a predetermined distance.

18. The method according to claim 17, further comprising positioning a center-point of the double frame on the current position for the positioning the start position.

19. The method according to claim 18, wherein the double frame comprises a rectangular outer frame defining the center-point and a rectangular inner frame arranged concentrically within the rectangular outer frame around the center-point, and the method further comprises aligning a horizontal area bisector parallel to an east-west direction of the digital road map.

20. The method according to claim 17, wherein repeatedly displacing the double frame comprises displacing the double frame along at least a first axis and a second axis.

* * * * *